Figure 6:
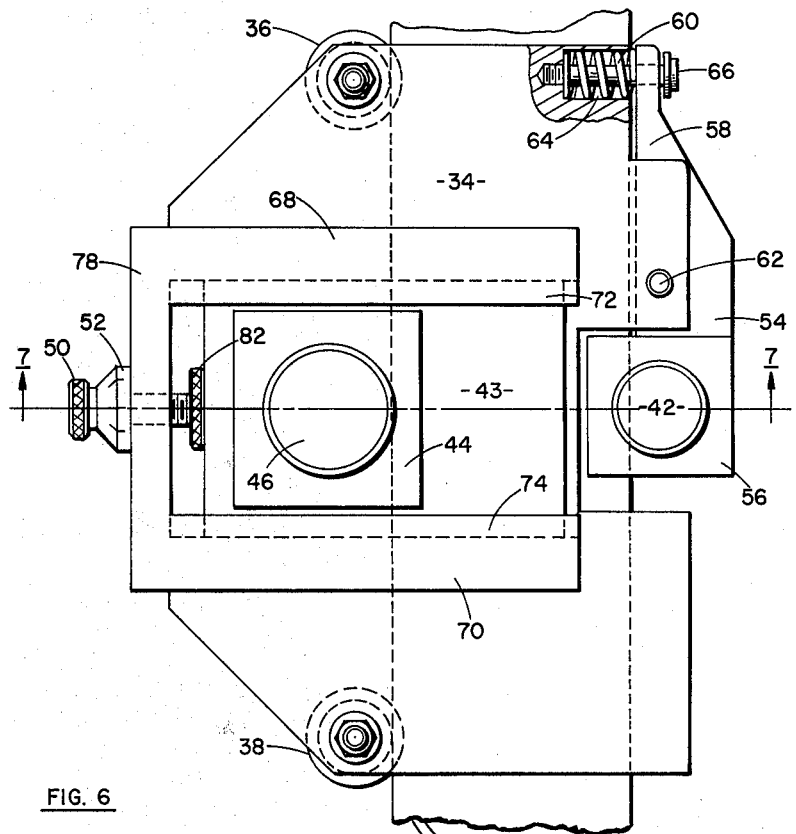

July 5, 1966  J. S. APPLETON ETAL  3,259,021
MULTIPLE PURPOSE FABRICATION APPARATUS AND METHOD
Filed May 5, 1961  13 Sheets-Sheet 1
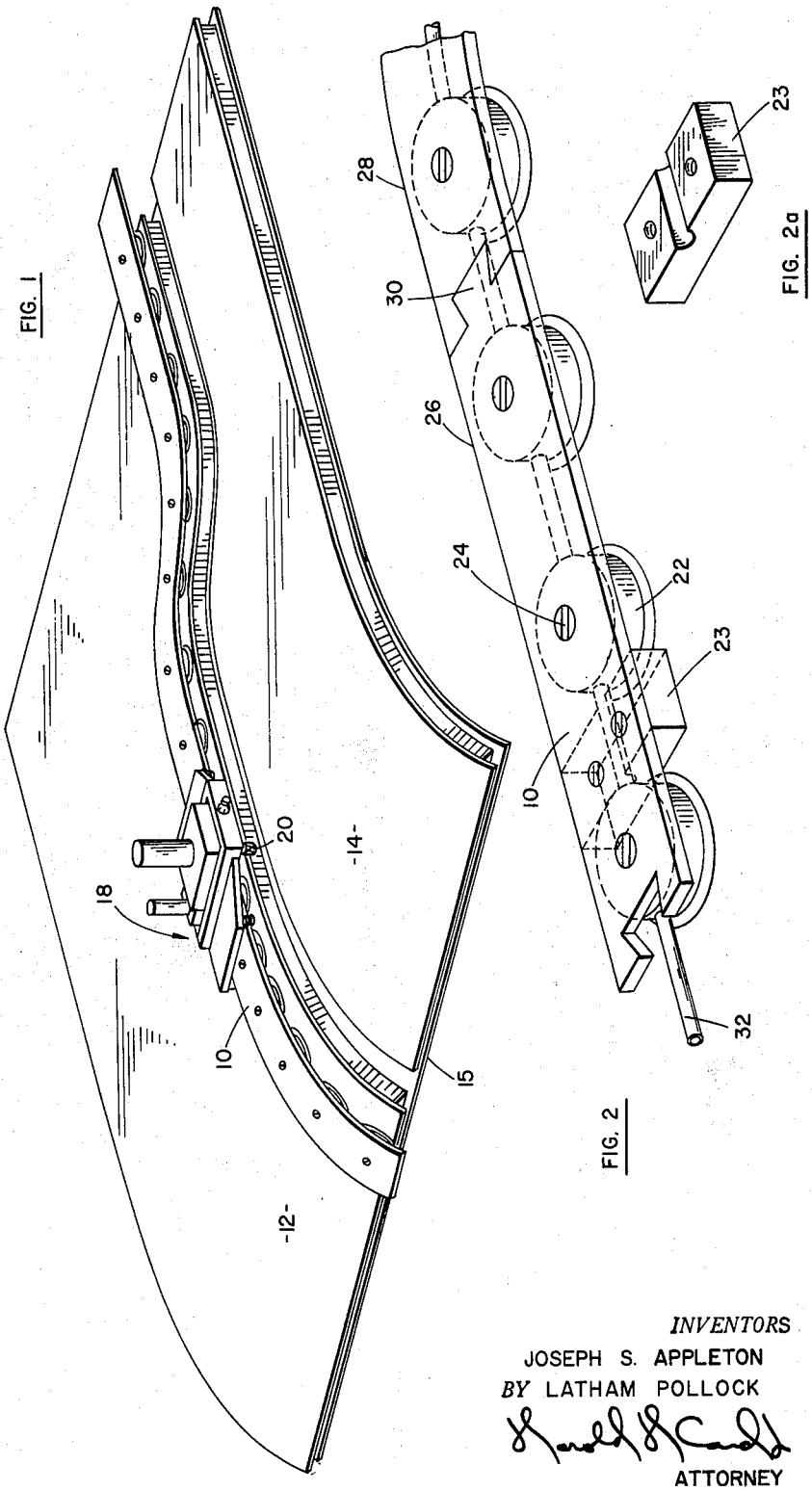
INVENTORS
JOSEPH S. APPLETON
BY LATHAM POLLOCK
ATTORNEY July 5, 1966 J. S. APPLETON ETAL 3,259,021
MULTIPLE PURPOSE FABRICATION APPARATUS AND METHOD
Filed May 5, 1961 13 Sheets-Sheet 2
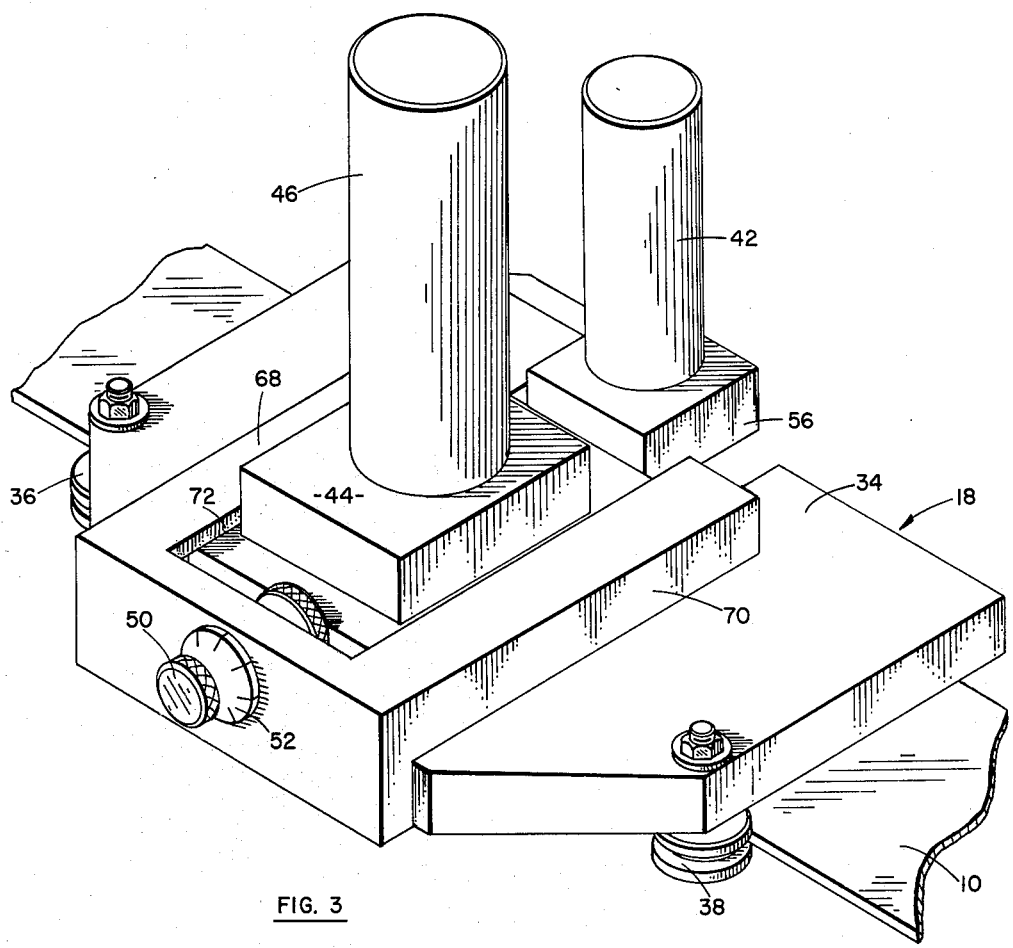
FIG. 3
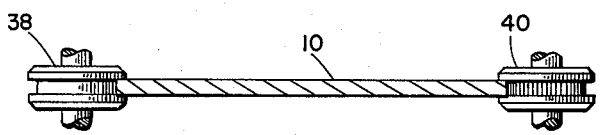
FIG. 4
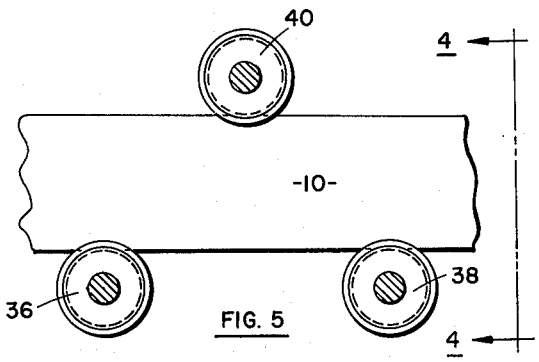
FIG. 5
*INVENTORS*
JOSEPH S. APPLETON
BY LATHAM POLLOCK
ATTORNEY

INVENTORS
JOSEPH S. APPLETON
BY LATHAM POLLOCK

ATTORNEY

July 5, 1966  J. S. APPLETON ETAL  3,259,021
MULTIPLE PURPOSE FABRICATION APPARATUS AND METHOD
Filed May 5, 1961  13 Sheets-Sheet 4

INVENTORS
JOSEPH S. APPLETON
LATHAM POLLOCK
BY
ATTORNEY

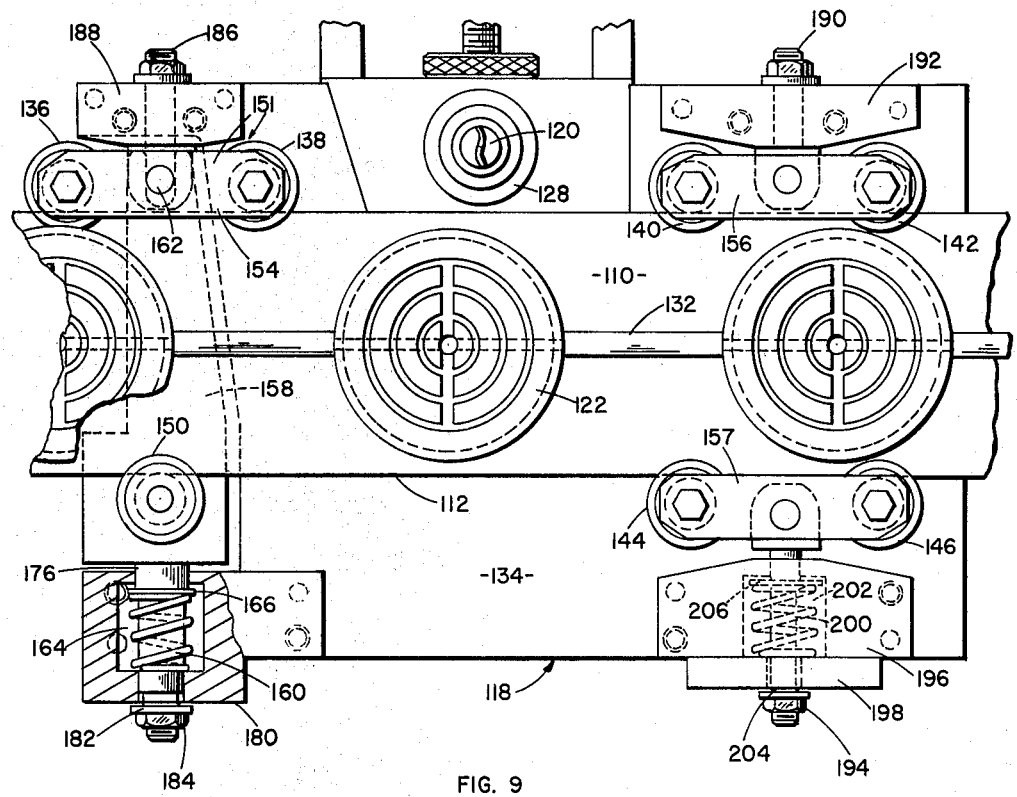
FIG. 9
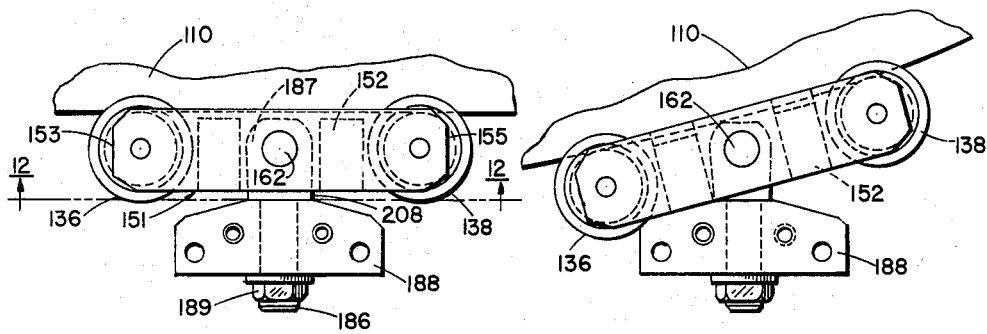
FIG. 10
FIG. 11
FIG. 12
INVENTORS
JOSEPH S. APPLETON
BY LATHAM POLLOCK
ATTORNEY July 5, 1966   J. S. APPLETON ETAL   3,259,021
MULTIPLE PURPOSE FABRICATION APPARATUS AND METHOD
Filed May 5, 1961   13 Sheets-Sheet 7

INVENTORS
JOSEPH S. APPLETON
BY LATHAM POLLOCK

ATTORNEY

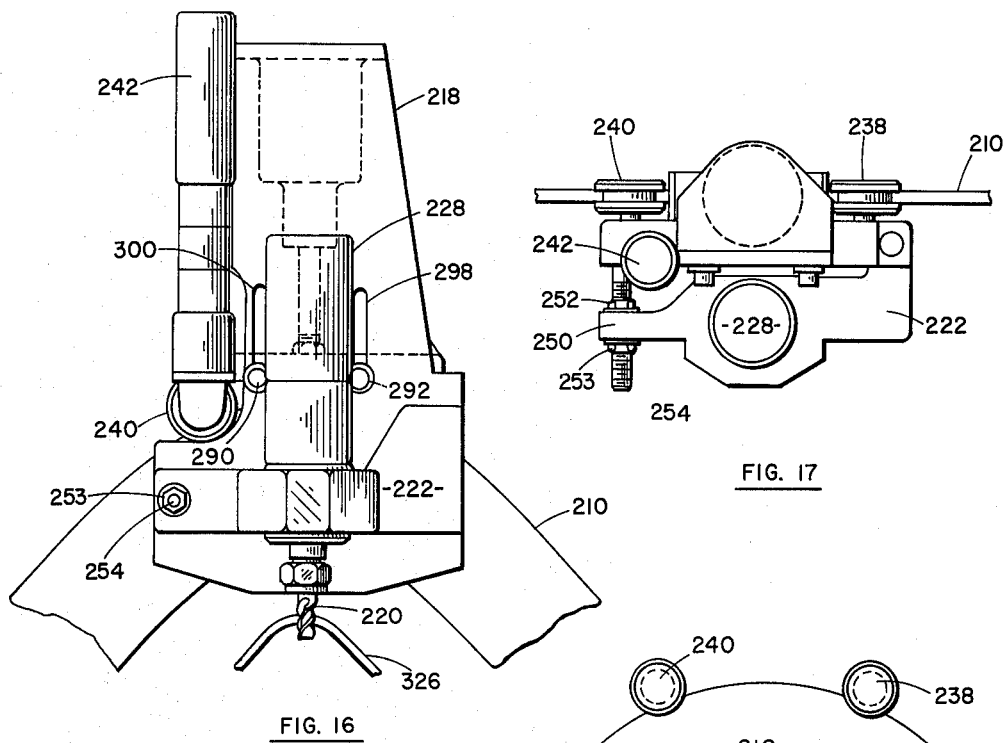
FIG. 16
FIG. 17
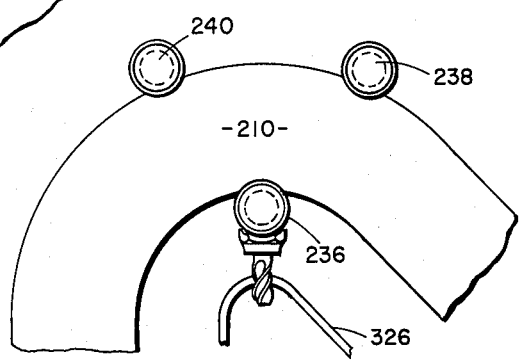
FIG. 18
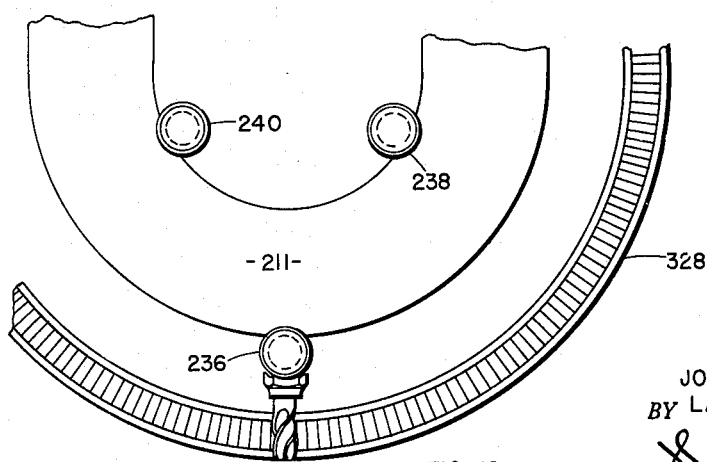
FIG. 19
INVENTORS
JOSEPH S. APPLETON
BY LATHAM POLLOCK
ATTORNEY July 5, 1966 J. S. APPLETON ETAL 3,259,021
MULTIPLE PURPOSE FABRICATION APPARATUS AND METHOD
Filed May 5, 1961 13 Sheets-Sheet 9

INVENTORS
JOSEPH S. APPLETON
BY LATHAM POLLOCK

ATTORNEY

July 5, 1966     J. S. APPLETON ETAL     3,259,021
MULTIPLE PURPOSE FABRICATION APPARATUS AND METHOD
Filed May 5, 1961
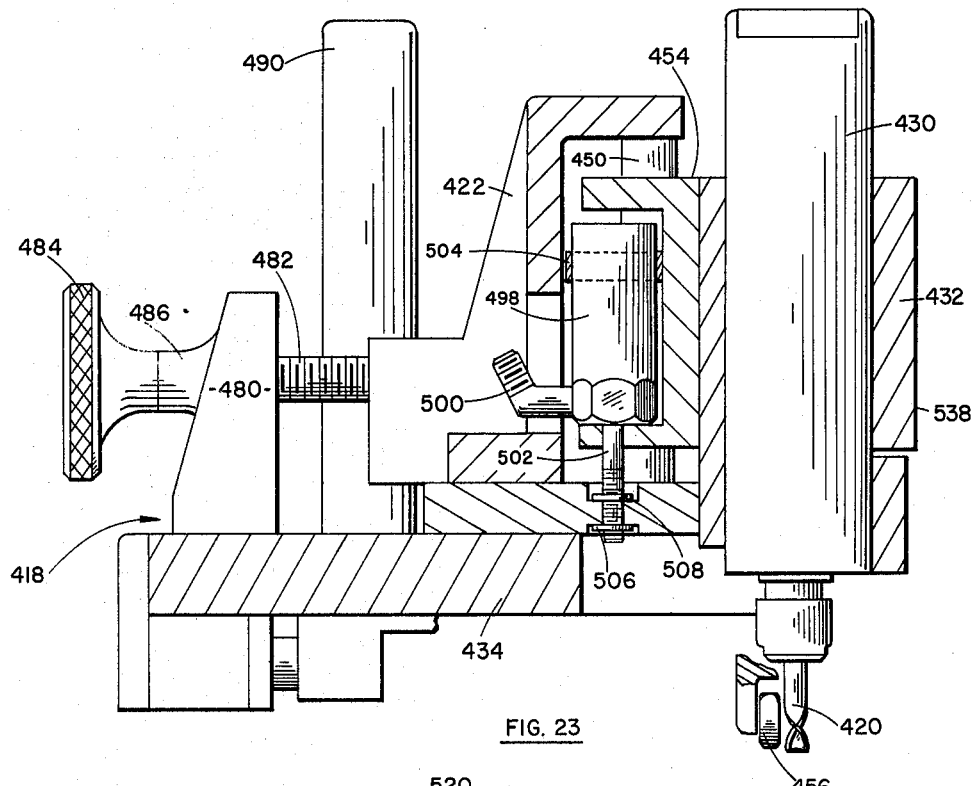
FIG. 23
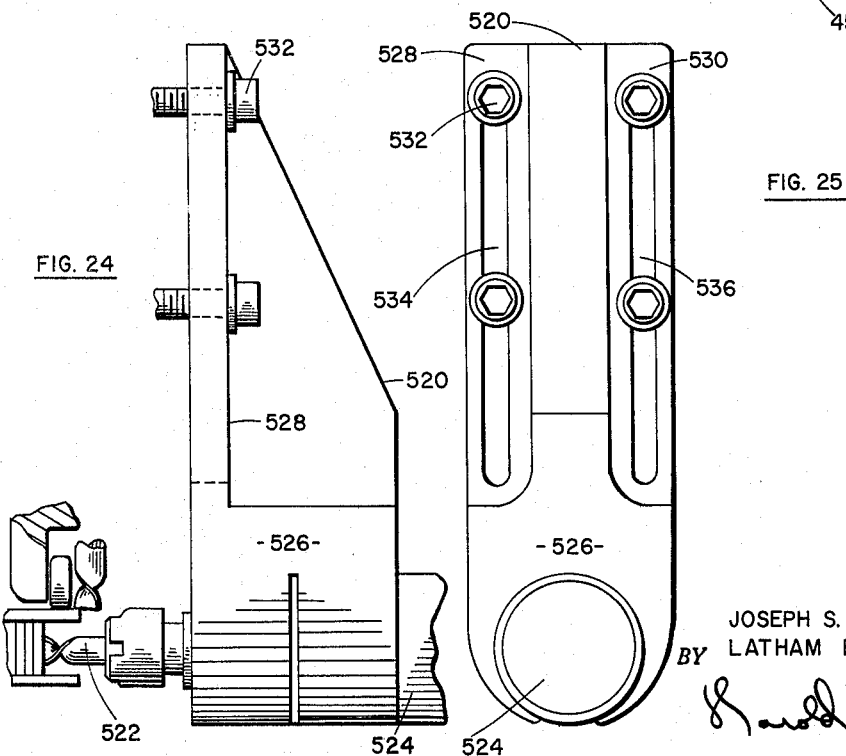
FIG. 24
FIG. 25
*INVENTORS*
JOSEPH S. APPLETON
LATHAM POLLOCK
BY
ATTORNEY July 5, 1966   J. S. APPLETON ETAL   3,259,021
MULTIPLE PURPOSE FABRICATION APPARATUS AND METHOD
Filed May 5, 1961   13 Sheets-Sheet 13

INVENTORS
JOSEPH S. APPLETON
LATHAM POLLOCK
BY
ATTORNEY

United States Patent Office 3,259,021
Patented July 5, 1966

3,259,021
MULTIPLE PURPOSE FABRICATION APPARATUS
AND METHOD
Joseph S. Appleton, Gardena, and Latham Pollock, Pacific Palisades, Calif., assignors to North American Aviation, Inc.
Filed May 5, 1961, Ser. No. 108,111
16 Claims. (Cl. 90—13)

This invention concerns method and apparatus for accomplishing various types of manufacturing operations on large workpieces including high speed precision machining operations, welding operations, and inspection of workpiece material. More particularly, the invention contemplates improved method and apparatus for performing various operations on large workpieces by inexpensive, lightweight, portable and versatile equipment which accomplishes these operations with improved accuracy and speed.

The invention disclosed herein is of extremely broad application and constitutes a new production technique amounting to a major breakthrough in the manufacturing field. However, for the sake of illustration, the inventive concept will be explained in connection with large honeycomb panel workpieces of precipitation-hardenable stainless steel having surface contours of complex curved form. It will be apparent from the explanation contained herein that the inventive concept is in no sense limited to the specific machining operations, welding or inspection devices described to illustrate the same.

A particular need for this invention exists in connection with the fabrication of ultra high speed aerial and space vehicles, wherein structural components must be high strength, lightweight, and capable of withstanding the extreme temperatures and stresses encountered during operation of the vehicle. For example, reinforced skin surfaces of precipitation-hardenable stainless steel alloy are necessary, and are formed by large sections of sandwich type panels which are separately fabricated and thereafter joined together. In the manufacture of such panels, thick slabs of honeycomb core material of thin metal foil are accurately cut to produce uniform thickness throughout the section, and are thereafter brazed to sheet metal top and bottom panel surfaces. Sandwich type panels such as described above are used extensively to form the external surfaces of vehicles of the stated type, the separate panel sections being welded together along their adjacent edges to form such surfaces.

However, fusion welding of material in extremely thin sheet form along edges of the lengths involved in the problem situation stated above requires extremely specialized techniques. In fusion welding, the puddle temperature is often much higher than the melting point of the base metal, and some of this heat permeates the base metal surrounding the weld area. Thermal changes such as expansion and contraction are virtually unavoidable, as well as changes in physical characteristics such as strength and ductility. Moreover, metallurgical effects such as crystallization and heat treatment occur due to the application of welding heat.

These effects are particularly severe in the case of joining two light metallic members to each other, wherein the masses of metal involved are insufficient to absorb safely the welding heat within the time required to effect fusion of the materials. High residual and heat stresses in the welded parts result from rapid and uneven cooling of molten metal in the area of the weld, and from phase transformation of the granular structure in the base metal beyond the area of the weld. Residual and heat stresses have a highly detrimental effect on the strength of the welded specimen, and usually produce severe distortion in the case of thin-walled members.

Accurate fitting of welded components in vehicles of the stated class is essential, especially where large sections must be joined together along continuous high strength weld seams, and avoidance of the slightest distortion and resulting misalignment are commensurately important. Any waves or dents along either of the edges to be joined would vary the clearance between the welding head and the precise area to which welding heat is applied. Variations in the stated clearance would produce non-uniform heat intensity and distribution, each of which affects the strength of the completed weld joint, the cooling rate throughout the area of the weld, and the size of the weld area, all of which in turn produce distortion which cannot be remedied by any known means in view of the sensitive nature of the lightweight panel elements. Similarly, gaps between the adjacent edges of the panels before welding would have cumulative effects on the condition of the weld equally as deleterious as those resulting from waves or dents.

Avoidance of the several effects mentioned above requires particular attention to the condition of the edges to be welded. Strong, clean and accurate welded joints in thin-walled metallic sections such as encountered in the problem situation described herein depend upon careful preparation of the edges to be joined. Each of the edges must be accurately cut to form a precise counterpart of the other so that in abutting relationship the edges will mate exactly and contact between them will be even and continuous throughout their length. Moreover, each of the edges must be squarely cut and free of waves, bends, burrs and dents. Since the trimming operations performed during normal fabrication of sheet metal panels such as described hereinabove does not produce the necessary dimensional accuracy for precision welding in the manner stated, the panel edges require special cutting prior to the welding operation.

The problem of cutting panels of the type described above is aggravated by the fact that precipitation-hardenable stainless steel alloys are used in their manufacture. Illustrative of these materials is the alloy commonly designated PH15–7Mo, comprised of the following components:

| | |
|---|---|
| Carbon, percent maximum | 0.09 |
| Manganese, percent maximum | 1.00 |
| Phosphorus, percent maximum | 0.04 |
| Sulphur, percent maximum | 0.03 |
| Silicon, percent maximum | 1.00 |
| Chromium, percent | 14.00 to 16.00 |
| Nickel, percent | 6.50 to 7.75 |
| Molybdenum, percent | 2.00 to 3.00 |
| Aluminum, percent | 0.75 to 1.50 |
| Iron, balance | |

In the prior art, edge trimming or contour cutting of double-walled panels such as described above would normally be accomplished by huge, heavy and expensive machines such as horizontal boring mills capable of trimming precipitation-hardenable stainless steel in the form stated at a maximum rate of one inch per minute. Moreover, use of conventional equipment such as that stated would not produce the required accuracy or versatility, hence would involve a plurality of fixtures and attachments to produce the necessary precision and relative path of travel resulting in the desired shape and condition of cut, the cost of such fixtures amounting to a considerable additional expense. In addition, where cuts of compound curve form are necessary in panels of the stated type, conventional devices such as horizontal boring mills are further limited by their inability to move a cutting head rapidly along a complex predetermined path of travel.

Accordingly, it is a general object of this invention to provide improved apparatus for performing a plurality of fabrication operations on a workpiece with improved rapidity and versatility along a precise predetermined and automatically controlled path of travel.

It is a further object of this invention to provide apparatus as set forth in the above object incorporating means by which cutting of the material in a workpiece may be accomplished with improved accuracy without necessitating movement of the workpiece.

It is also an object in this case to provide apparatus of improved lightweight, portable, and inexpensive nature for achieving the objects set forth herein.

It is an additional object in this case to provide apparatus for performing welding on a workpiece with improved rapidity along a precise predetermined and automatically controlled welding path.

It is a further object of the invention disclosed herein to provide apparatus for performing welding as stated in the preceding object in a single welding pass on workpieces of relatively large size and nonplanar shape.

Figure 7:
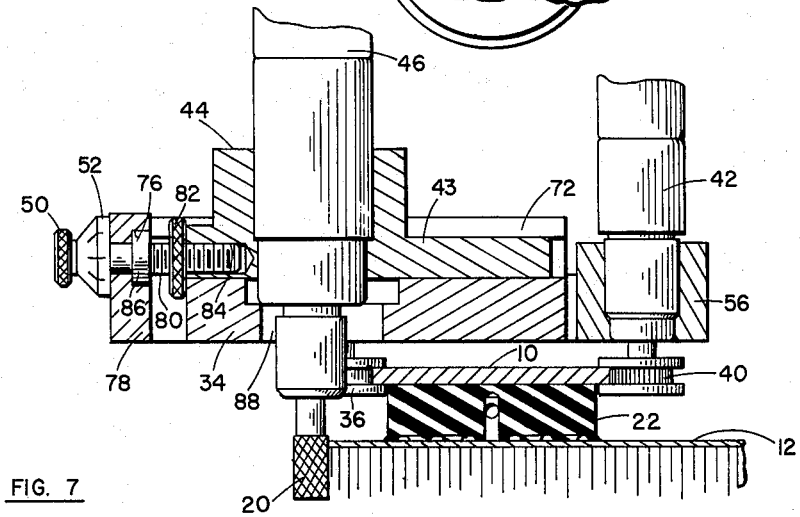
Figure 8:
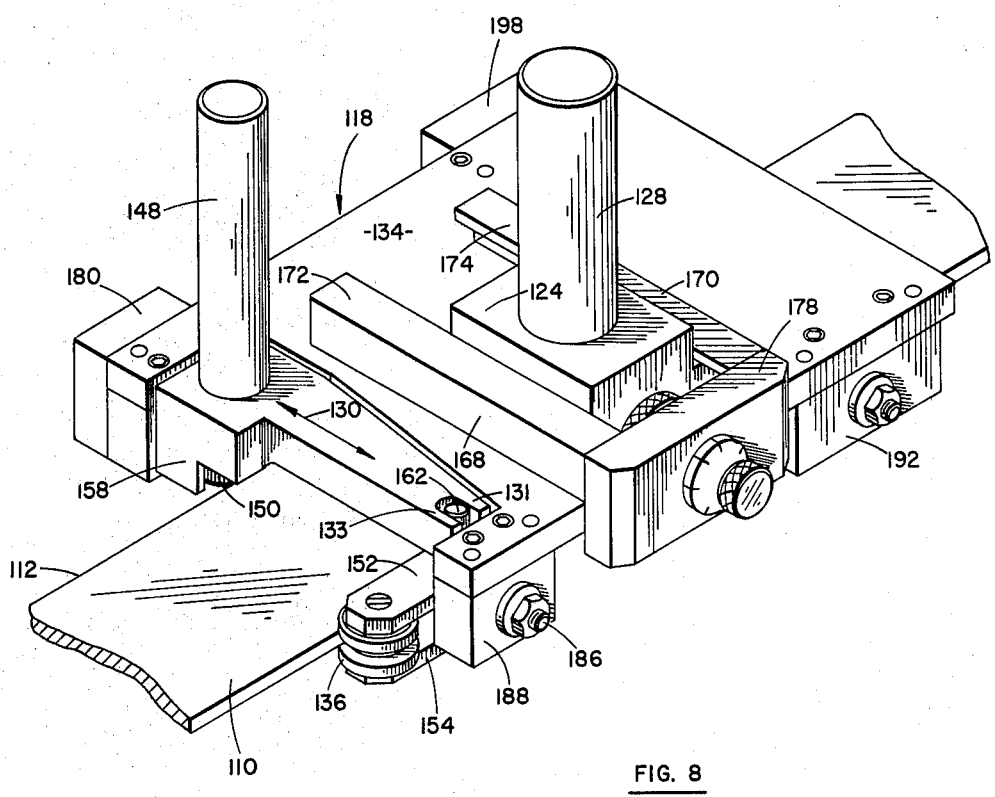
Figure 13:
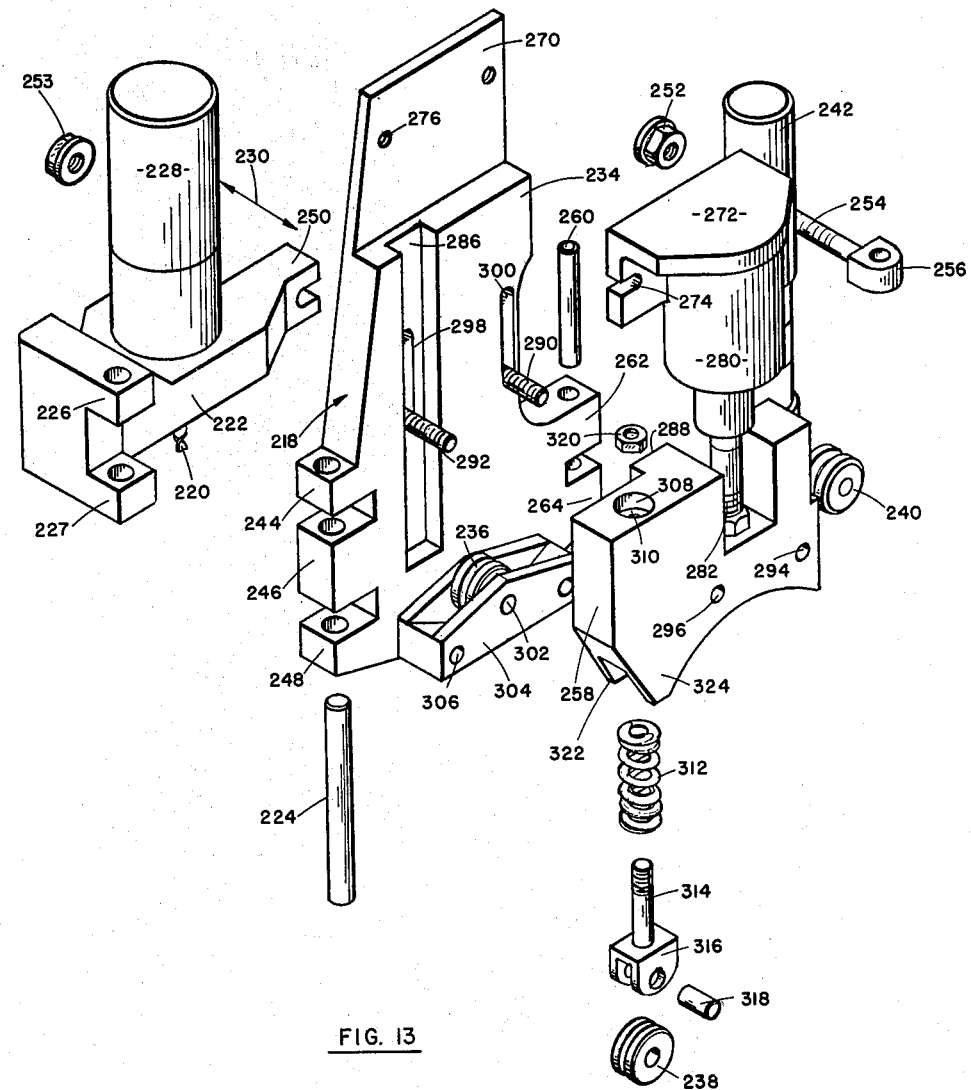
Figures 14, 15:
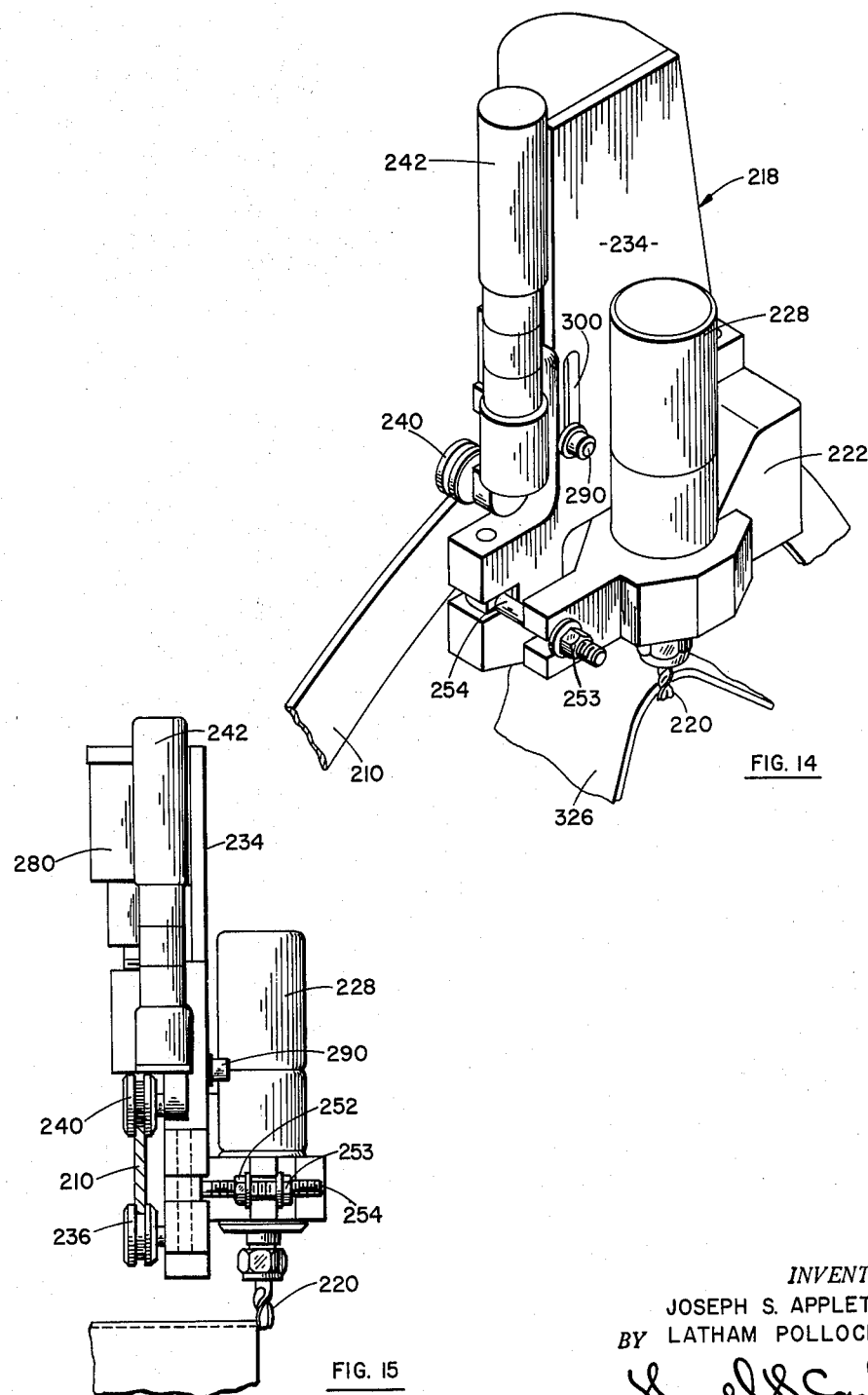
Figure 20:
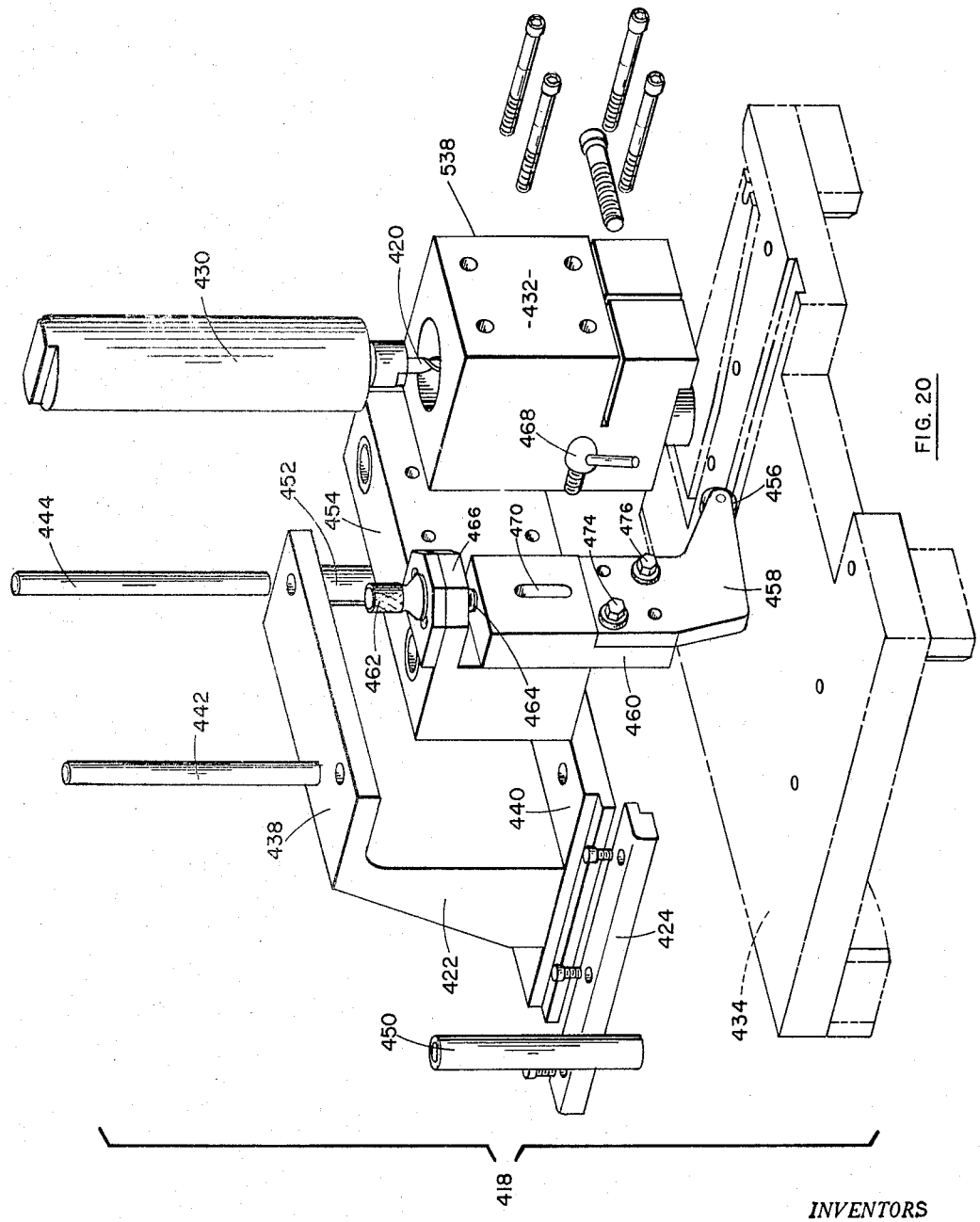
Figure 21:
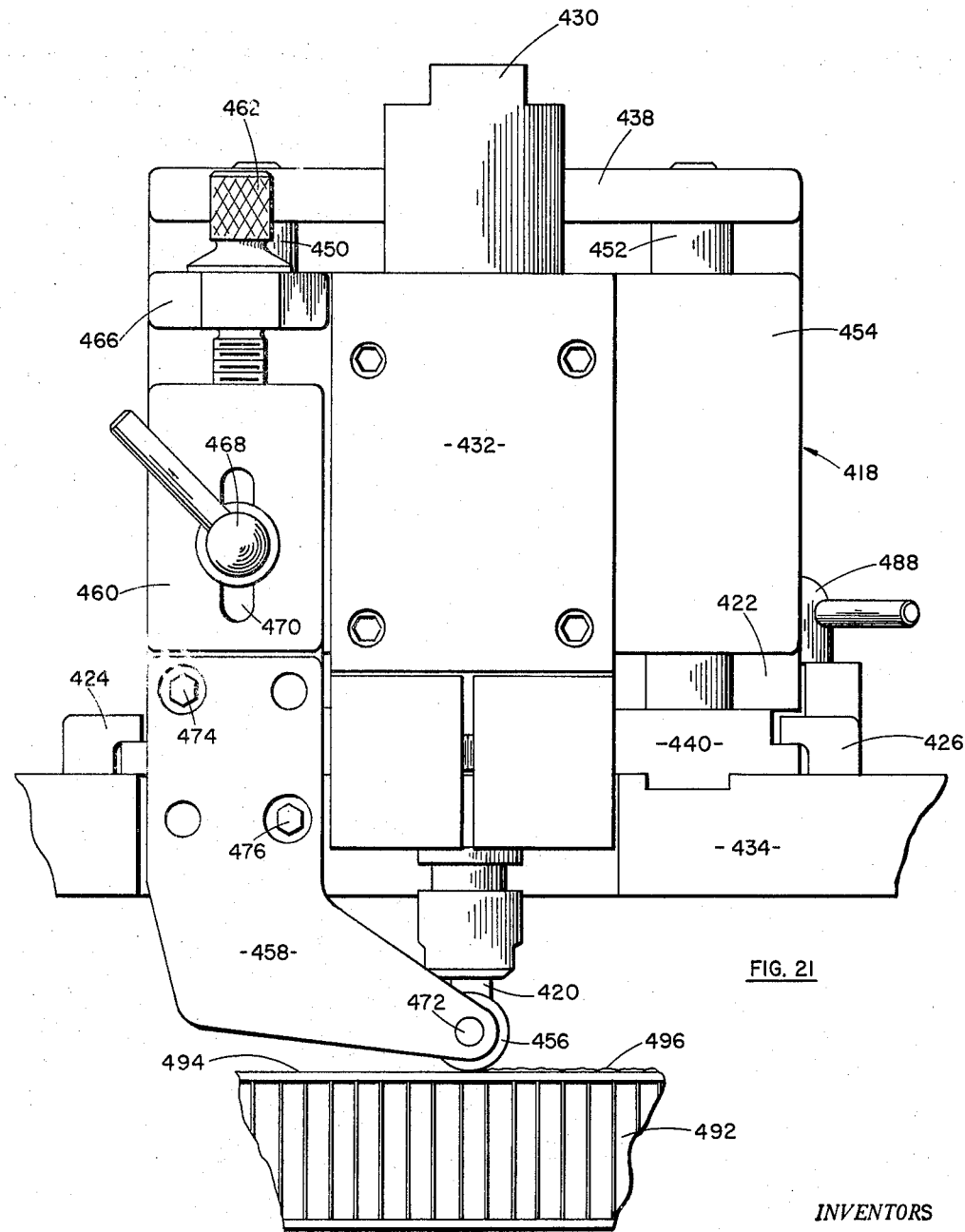
Figure 22:
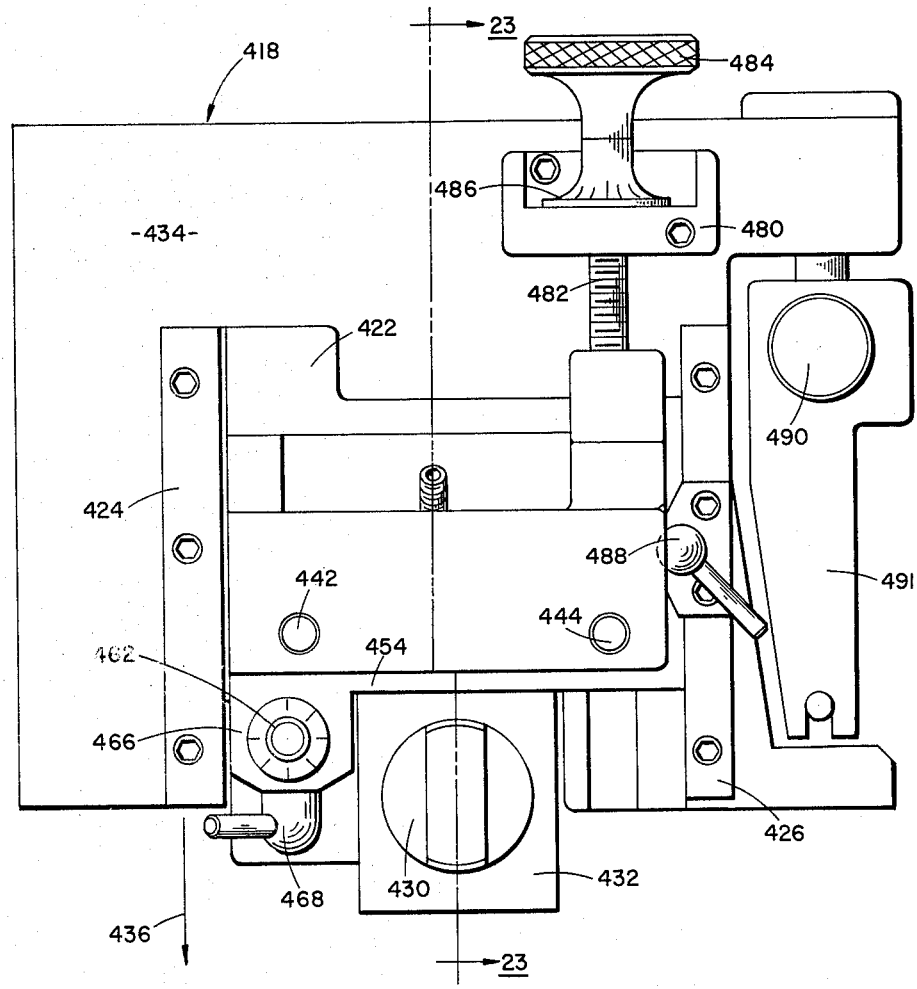
Figure 26:
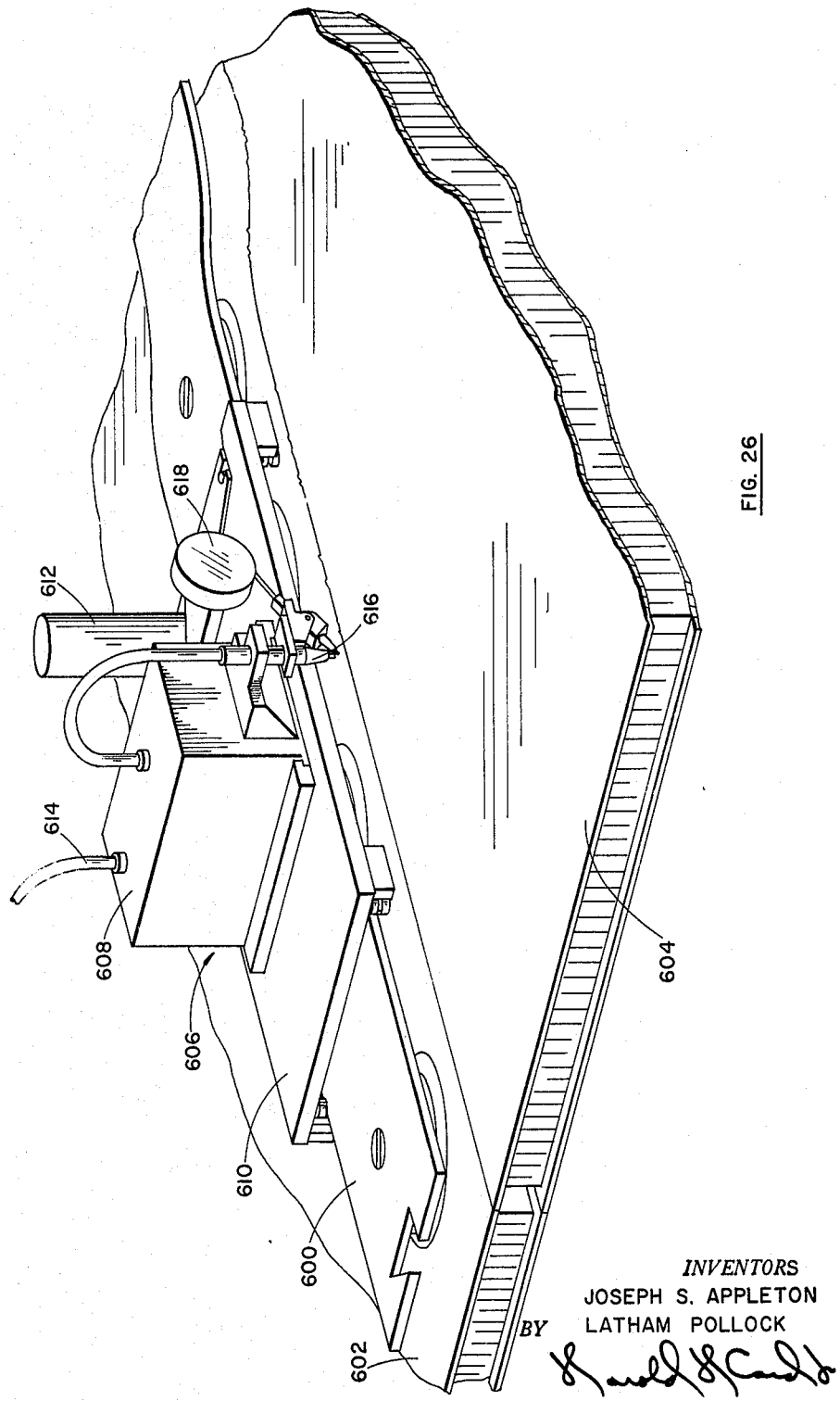

Other objects and advantages of the structure disclosed herein will become apparent upon a close reading of the following detailed description of several illustrative embodiments of the inventive concept, reference being had to the accompanying drawings, wherein:

FIGURE 1 shows a general perspective view of a machine tool embodying the inventive concept disclosed herein as applied to precision cutting of panels, FIGURE 2 shows a perspective view of a track such as may be used in cooperation with the tool of FIGURE 1, FIGURE 2a shows an isolatd view in perspective of an attaching magnet such as may optionally be used with the track of FIGURE 2, FIGURE 3 shows an enlarged perspective view of the tool of FIGURE 1, FIGURE 4 is a detail view, partly in cross-section, showing the relationship between the supporting rollers and track in the structure of FIGURE 1, FIGURE 5 is a plan view of the structure shown by FIGURE 4, FIGURE 6 is a plan view, partly in section of the tool shown in FIGURE 1 seen from above, FIGURE 7 is a cross-sectional view of the tool shown by FIGURE 6 taken along line 7—7 indicated thereon, FIGURE 8 is a perspective view of a tool generally corresponding to the tool shown in FIGURE 1 except with an alternative embodiment for the track-engaging rollers, FIGURE 9 is a bottom plan view of the tool shown in FIGURE 8 showing the alternative embodiment of the track-engaging rollers differing from the arrangement of FIGURE 5, FIGURES 10 and 11 show the relationship between the springless mounted rollers and track of FIGURE 9 during linear and arcuate travel, respectively, FIGURE 12 shows a side view in elevation of a roller such as used in mounting the tool of FIGURE 1, FIGURE 13 shows an exploded view of a machine tool incorporating the same basic principles as the tool shown in FIGURE 1 modified for use on a curved vertical track, FIGURE 14 shows a general perspective view of the machine tool shown by FIGURE 13 assembled and operatively associated with a track, FIGURE 15 shows a side view in elevation of the tool shown by FIGURE 14, FIGURE 16 shows a front view in elevation of the tool shown by FIGURE 14, FIGURE 17 shows a top view of the tool shown by FIGURE 14, FIGURE 18 shows an elevational view of a curved vertical track such as used in cutting an edge or surface on a curved workpiece of lesser radius than the track, FIGURE 19 shows an elevational view of a curved vertical track such as used in cutting an edge or surface on a curved workpiece having greater radius of curvature than the track, FIGURE 20 shows an exploded view in perspective of apparatus incorporating the same inventive principles as the apparatus shown in FIGURES 1 and 13, for example, including improved means for adjusting the cutter thereon, FIGURE 21 shows a front elevation of the device of FIGURE 20 assembled and operatively associated with a workpiece, FIGURE 22 shows a plan view of the device of FIGURE 21 as seen from above, FIGURE 23 shows a side view, partly in section, taken along line 23—23 of FIGURE 22 and rotated 90 degrees counter-clockwise, FIGURES 24 and 25 show a side and front elevation, respectively, of an attachment adapted for use on the device of FIGURE 21, and FIGURE 26 shows a general perspective view of a welding tool incorporating the same basic principles for mobility as the cutting tool shown in FIGURE 8, for example.

Referring to the drawings described above and particularly to FIGURE 1, an illustrative form of the invention disclosed herein may be seen adapted for use in cutting or trimming large panels of non-uniform shape having relatively dense upper and lower surfaces with a low density filler material therebetween. In essence, this form of the invention comprises template or track means including a rigid elongate member in the form of track 10 secured to a portion of workpiece 12 and a carriage or mobile unit 18 upon which various different tools or devices may be mounted such as cutting tool 20, for example, shown in FIGURE 1 and FIGURES 3–7, inclusive. Track 10 may be straight, curved in plan or in elevation, or both, in any case follows the contour of workpiece 12 and functions as a template to determine the precise shape of cut resulting from operation of a tool supported thereon.

Track 10 is shown in greater detail in FIGURE 2, wherein it may be seen that holding means in the form of suction cups 22 are secured to the track by screws 24, while the track itself may be formed in a plurality of separate sections such as 26 and 28 secured together by dovetail joints as indicated at 30 or equivalent interlocking means. Conduit means are provided in the form of tubular connection 32 communicating between the various cups 22 so that a vacuum may be applied thereto by suitable means such as a vacuum pump (not shown).

Alternatively or in addition to cups 22, a plurality of individual magnets 23 as shown by FIGURE 2a be used to attach track 10 to workpiece portion 12 or 14, particularly when extreme rigidity is required to hold track 10 immovable during the application of force thereto or during vibration caused by operation of various tools supported thereon.

The mobile unit of FIGURE 1 appears in greater detail in FIGURE 3 wherein it may be seen that carriage 18 consists essentially of a frame or platform portion 34 firmly supported upon track 10 and in rolling contact therewith by means of a plurality of rollers, two of which are indicated at 36 and 38. Drive means for driving carriage 18 along track 10 are provided in the form of motor 42 which may be powered by electricity, air or other means and which in any case is mounted upon platform 34 as shown.

Also mounted on platform 34 and supported by a sliding member 44 is a cutting tool including a drive motor 46 connected to cause rotation of the high speed cutter 20 shown, for example, in FIGURE 7. The position of cutter 20 with respect to the workpiece is adjustable by means of a knob 50 cooperating with a scale 52 to provide means for indicating the cutter position, all as explained in greater detail below. Rollers 38 and 40 operatively engaging track 10 to support platform 34 thereon are shown by FIGURES 4 and 5 in side and plan view, respectively. Also, from FIGURE 5 it may be seen that three-point stability is established for platform 34 by the arrangement of guide rollers 36 and 38 engaging one side of track 10 while driving roller 40 engages the opposite side of the track.

Additional details of mobile unit 18 are shown by FIGURE 6 wherein it may be seen that drive motor 42 and rotating parts connected therewith are mounted on pivoting means in the form of movable member 54 which is provided at one end with block means 56 for securely holding the housing for the stated motor and parts, and at the other end is provided with a lever arm 58 against which the force of a spring 60 continually bears. Intermediate the two stated ends of member 54, a vertical pin 62 pivotally supports the member in a manner permitting a limited range of rotational movement about the center of pin 62. Compression spring 60 is housed within a cavity 64 formed in the side of platform member 34 with one end of the spring applying force against the bottom of the cavity and the other end applying equal and opposite force to lever arm 58. Due to the pivoting feature of member 54 about pin 62, force applied by spring 60 tending to move lever arm 58 toward the right as drawn in FIGURE 6 forces drive roller 40 firmly against the side of track 10 with which the roller operatively engages. Cap screw 66 is also provided in threaded engagement with platform member 34 and aligned within cavity 64 to provide means for limiting the maximum amount of movement of lever arm 58 under the influence of spring 60 in the stated manner.

As further shown by FIGURE 6, sliding member 43 is formed with block means 44 which holds motor 46 and permits adjustment of the position of cutter 20 by movement of member 43 between two guides or ways 68 and 70, each having an overhanging ledge 72 and 74, respectively, projecting toward member 43 and contacting the upper surface thereof on opposite sides of the member. Movement of member 43 toward the left or right as drawn in FIGURES 6 and 7 to adjust the cutter position with respect to workpiece 12 is accomplished by rotation of adjusting knob 50 which is integrally formed on one end of screw shaft 80.

As shown more particularly by FIGURE 7, screw shaft 80 is rotatably journaled within a hole 76 in interconnecting portion 78 extending between guides 68 and 70. Screw shaft 80 is threadedly engaged within a hole 84 in sliding member 43 and is similarly engaged by a locking nut 82. Screw shaft 80 is further provided with a collar 86 affixed thereon and situated within an enlarged portion of hole 76 as shown by FIGURE 7 so that lateral movement of screw shaft 80 relative to portion 78 is prevented in one direction by scale 52 affixed to the shaft and in the other direction by collar 86. Since guides 68, 70, and intermediate portion 78 extending therebetween are stationary with respect to platform 34, it may be seen from the description of structure shown and described that rotation of adjusting screw 80 by means of knob 50 causes linear movement of sliding member 43 between the stated guides relative to platform 34. During movement of member 43 by means of knob 50, cutter 20 and parts interconnecting the cutter with motor 46 move in a slot or opening 88 in platform 34 as shown more particularly by FIGURE 7. When member 43 is positioned so that cutter 20 is correctly located with respect to workpiece 12, locking nut 82 may then be rotated on threaded shaft 80 so that nut 82 is forced firmly against member 43, effectively preventing further rotation of shaft 80 in either direction and thereby securely holding cutter 20 and movable parts associated therewith in constant lateral relationship.

As one illustrative type of use for mobile unit 18, it may be seen from FIGURE 1 that track 10 is mounted on panel workpiece 12 to form a template which guides and controls the path of movement of unit 18. Panel workpiece 14 may be placed in close proximity to panel 12 in the manner shown by FIGURE 1 so that lateral adjustment of tool 20 will suffice to permit trimming the edges of both workpieces 12 and 14 by use of the same template.

A mobile unit 118 corresponding generally with unit 18 shown in FIGURES 1 and 3–7, inclusive, except for drive motor and track mounting details as discussed below is shown in FIGURES 8–12, inclusive. Referring particularly to FIGURE 8, carriage or mobile unit 118 is supported on a track 110 which may be secured to a workpiece by suitable means such as described above in connection with FIGURES 1 and 2. Carriage 118 includes a frame or platform portion 134 supported in rolling contact with track 110 by a plurality of guide rollers, one of which is designated by reference numeral 136 in FIGURE 8. Drive means for driving unit 118 along track 110 are provided in the form of motor 148 which may be powered by electricity, air or other means and which in any case is mounted upon frame or platform 134 as shown.

Also mounted on platform 134 and supported by a sliding member 124 is a cutting tool including a drive motor 128 connected to cause rotation of high speed cutter 120 shown, for example, in FIGURE 9. The position of cutter 120 with respect to the workpiece is adjustable by means of a knob 158 in a manner precisely similar to the operation of knob 50 described above in connection with FIGURES 3–7, inclusive.

From FIGURE 8 it may be seen that drive motor 148 is mounted within a supporting member 158 which is in fact transversely slidable with respect to platform 134 in the direction indicated by arrow 130. Provision for relative sliding movement between members 134 and 158 is made in a manner set forth in greater detail below, but includes a pin 162 which contacts a pair of tangs 131 and 133 integrally formed on member 158 and extending on either side of pin 162. Thus, during lateral movement of member 158 in the direction indicated by arrow 130, pin 162 provides sliding engagement of member 158 permitting such movement at the right-hand end thereof as viewed in FIGURE 8, while preventing fore and aft movement of the stated end with respect to the direction of travel of carriage 118 due to operative engagement of pin 162 with tangs 131 and 133.

Additional details of carriage or mobile unit 118 are shown by FIGURE 9 wherein it may be seen that platform 134 is supported upon track 110 by a plurality of rollers 136–146 mounted in pairs on a plurality of trucks 151, 156 and 157. Due to their similarity, a detail description of truck 151 will provide a sufficient understanding of the structure involved in trucks 156 and 157. As shown more particularly by FIGURES 10 through 12, truck 151 includes an upper member 152 and a lower member 154 aligned with respect to each other and joined at either end by pins 153 and 155 upon which guide rollers 136 and 138 are rotatably mounted, respectively. A lateral pivot pin 186 having flatted portion 187 integrally formed at one end thereof extends into the gap between portions 152 and 154. Pivot pin 162 extending between portions 152 and 154 and also through flatted portion 187 permits pivoting motion of truck 151 about the center of pin 162 as shown by comparison of FIGURES 10 and 11. The cylindrical portion of pin 186 is rotatably journaled within a downwardly depending mounting lug 188 as shown, for example, in FIGURES 9 and 10 and is secured thereon by suitable means such as holding nut 189. From the description of structure set forth in connection with truck 151 which is equally applicable to trucks 156 and 157, it may be seen that each of the stated trucks is mounted in a manner permitting pivotal movement of the truck about two perpendicular axes of rotation.

From FIGURE 9 it may also be seen that slidable member 158 is provided with a cylindrical shaft or spindle 176 at the end opposite from tangs 131 and 133. Spindle 176 may be integrally joined to member 158 and extends through a cavity 164 in a downwardly depending mounting lug 180 affixed to platform 134 in a manner similar to lugs 188, 192 and 196 referred to above. Spindle 176 is provided with an annular flange 166 and a threaded portion 182 upon which a stop nut 184 is engaged by oppositely corresponding threads. By appropriate sizing of the holes in either side of lug 180 through which spindle 176 extends as shown by FIGURE 9, a sliding fit may be established to permit limited lateral movement of the spindle and of member 158 to which it is integrally joined. Within cavity 164 of lug 180, a compression spring 160 surrounds spindle 176 with one of its ends bearing against flange 166 while the other end of spring 160 bears against the inner wall of cavity 164.

From the description of structure set forth above relating to slidable member 158, it may be seen that the limited lateral movement of member 158 with respect to platform 134 results in the action of spring 160 forcing member 158 towards the right as viewed in FIGURE 8 or upwardly as viewed in FIGURE 9. Since motor 148 and drive roller 150 are secured to member 158 and laterally movable therewith, it will be understood that the extent to which spring 160 moves element 158 upwardly as viewed in FIGURE 9 is limited by contact between drive roller 150 and edge 112 of track 110. Thus, drive roller 150 is forced against edge 112 and maintained in continuous contact therewith by the force of spring 160 applied against flange 166 on spindle 176 and transmitted through slidable member 158. Moreover, since the centers of spindle 176 and pin 186 are axially aligned to produce a single axis of rotation at either end of member 158, it may be seen that pivoting movement of the stated member may occur about the axis of rotation thus defined.

Lateral movement of truck 157 in a direction parallel with that indicated by arrow 130 in FIGURE 8 is provided by structural means best shown in FIGURE 9. Thus, pivot pin 194 is operatively associated with truck 157 in a manner generally similar to the relationship between pin 186 and truck 151 described above in connection with FIGURES 10 through 12. However, in contrast with the structure shown by FIGURES 10 through 12, it may be seen from FIGURE 9 that pivot pin 194 extends through a cavity 202 formed within downwardly depending mounting lug 196. Pin 194 is provided with annular flange 206 against which one end of a compression spring 200 bears while the other end of the spring contacts closure plate 198 affixed to lug 196. By appropriate sizing of the holes in lug 196 and plate 198 through which pin 194 extends, a sliding fit is established to permit lateral movement of pin 194 and truck 157 under the influence of spring 200. Thus, it may be seen from the structure shown and described above, that spring 200 may force rollers 144 and 146 mounted on truck 157 in close contact with edge 112 of track 110. Stop nut 204 in threaded engagement with the lower distal end of pin 194 limits the total amount of movement of pin 194 which may result from the action of spring 200 by contacting the outer surface of plate 198.

Mobile unit 118 may be used in the same manner as that described above in connection with unit 18, although many other various uses will occur to those skilled in the art.

A mobile unit 218 embodying the same general principles as the devices described above and shown in FIGURES 3–9, inclusive, is shown in FIGURES 13–17, inclusive. Referring particularly to FIGURES 13 and 14, it may be seen that carriage or mobile unit 218 consists essentially of a frame or platform portion 234 firmly supported upon track 210 and in rolling contact therewith by means of a plurality of rollers 236, 238, and 240. Drive means for driving carriage 218 along track 210 are provided in the form of motor 242 which may be powered by electricity, air or other means and which in any case is mounted upon frame 234 as shown.

Also mounted on frame 234 and supported by a motor support member 222 is a cutting tool including a drive motor 228 connected to cause rotation of the high speed cutter 220. Motor support member 222 is pivotally mounted at one end thereof by lugs 226 and 227 on member 222 interspaced between lugs 244, 246 and 248 on frame 234. Pivot pin 224 penetrates each of the stated lugs forming a hinge connection permitting rotational movement of member 222 and components mounted thereon about an axis of rotation through the center of pin 224. Clevis 250 provided on member 222 at the end opposite from lugs 226 and 227 operatively engages screw bolt 254 affixed to a boss 256 which is pivotally journaled on pin 260 extending through lugs 262 and 264. Holding nuts 252 and 253 contacting either side of clevis 250 are threadedly engaged with screw bolt 254 and may be loosened to permit lateral adjustment of cutter 220 with respect to platform 234 by movement of clevis 250 in the direction indicated by arrow 230, after which holding nuts 252 and 253 are tightened to maintain the cutter in fixed relationship with platform 234.

As seen from FIGURE 18, for example, carriage 218 engages track 210 at three points of contact resulting from the arrangement of guide roller 236 on the inner track radius and rollers 238 and 240 on the outer track radius. Translational movement of rollers 238 and 240 relative to frame or platform 234 is provided by slide block 258 in a manner described below.

As shown by FIGURE 13, platform 234 is also provided with a flange-like projection or bearing plate 270 against which a load member 272 is securely held in fixed relationship by suitable means such as holding bolts extending through slots 274 and holds 276 in members 272 and 270, respectively. An air cylinder or pneumatic spring 280 is affixed to load member 272 and contains a piston attached to a push rod 282 which is threadedly engaged or otherwise affixed to slide block 258. Slide block 258 bears against a sliding surface 284 on platform 234 and is relatively movable with respect thereto. Guiding means for controlling or limiting the direction of such movement are provided in the form of channel guide 286 formed in surface 284 which is shaped to received a projecting ledge 288 on slide block 258 having corresponding shape and size except as to length. A pair of retaining bolts 290 and 292 threadedly engage holes 294 and 296, respectively, in slide block 258 and extend through two slots 298 and 300 formed in platform 234 to permit relative linear movement of retaining bolts 290 and 292 with respect to the platform.

As also shown by FIGURE 13, guide roller 236 is pivotally journaled by means of pin 302 on roller mounting member 304 affixed to platform 234 by suitable means such as mounting bolts 306. The stated mounting arrangement may be seen to permit rotational movement of roller 236 but otherwise to prevent relative movement of roller 236 with respect to platform 234.

Slide block 258 is further provided with a cavity 308 containing a shoulder 310 against which one end of spring 312 bears. Spring 312 surrounds a threaded shaft 314 affixed to a clevis 316 in which guide roller 238 is pivotally journaled by means of pin 318 when the parts shown in FIGURE 13 are completely assembled. The stated operative relationship between cavity 308 and roller 238 and related parts is maintained after assembly by retaining nut 320 threadedly engaging the end of shaft 314 above shoulder 310. By means of the stated mounting structure, roller 238 and clevis 316 are vertically movable in the views shown by FIGURE 13 with respect to slide block 258, while rotational movement of clevis 316 about an axis through the center of rod 314 is prevented by downwardly depending shoulders 322 and 324 in sliding contact with each side of clevis 316.

Since motor 242 and driving roller 240 together with driving connections therebetween are affixed to slide block 258, downward force applied by air cylinder 280 in the view shown by FIGURE 13, for example, may be seen to cause push rod 282 to force slide block 258 downwardly, resulting in the application of the stated force to rollers 238 and 240. The force thus referred to and applied through rollers 238 and 240 is opposed by an equal and oppositely acting force on roller 236 situated on the other side of track 210 from rollers 238 and 240. In addition to the translational movement of rollers 238 and 240 which may occur in unison by reason of their operative relationship with slide block 258, it may be seen from the mounting provisions of roller 238 that independent translational movement of this roller with respect to driving motor 240 is permitted under the influence of spring 312 which tends to maintain roller 238 in close and continuous contact with track 210.

Although the apparatus of FIGURES 1–25 may be used for automatic machining or other operations on a variety of diverse materials, workpieces and for different purposes, its operation in any case may be understood from the description set forth herein for the sake of illustration. The apparatus is particularly appropriate for use with curved workpieces, such as indicated at 326 and 328 in FIGURES 18 and 19, respectively. Workpiece 326 of FIGURE 18 is an end view of a curved metallic sheet having a relatively small radius of curvature. Track 210 is shaped to correspond with the curvature of workpiece 326 but has a larger radius of curvature.

Workpiece 328 shown in FIGURE 19 is a reinforced honeycomb steel panel having a relatively large radius of curvature, while track 211 of a shape corresponding to workpiece 328 has a lesser radius of curvature than the workpiece. In both of the examples illustrated by FIGURES 18 and 19, it may be seen that cutter 220 is directed toward the workpiece and in operative relationship therewith regardless of the relative locations between the track and the workpiece or of variations in the precise convolutions of either. Accordingly, in operating mobile unit 218, the unit is first mounted on a track such as shown at 210 or 211, and cutter 220 is positioned laterally with respect to the workpiece by movement of holding nuts 252 and 253 on shaft 254. Translational movement of the stated holding nuts causes pivotal movement of member 222 about a center axially through pin 224, after which the holding nuts may be tightened on either side of clevis 250 to retain cutter 220 in a constant relationship with respect to the workpiece. Following this adjustment, actuation of drive motor 242 causes rotation of roller 240 resulting in movement of platform portion 234 and all elements mounted thereon. This movement is accompanied by simultaneous operation of motor 228 to rotate cutter 220.

During movement of mobile unit 218 progressively along the track upon which it is mounted, force is continually applied by resilient means such as pneumatic cylinder 280 in a direction tending to hold rollers 238 and 240 continually in engagement with the edge of the track which they contact. The stated force originating within cylinder 280 is applied by push rod 282 to slide block 258 upon which rollers 238 and 240 are mounted. In addition to the force from push rod 282, an additional force from spring 312 is applied to roller 238 tending to maintain roller 238 in continuous and close engagement with the track against which the roller bears. Thus, the structure shown principally in FIGURE 13 and described above in connection therewith permits independent translational movement of roller 238 relative to roller 240 in order to facilitate movement of mobile unit 218 around curves of non-uniform radius or the like. The total force applied to rollers 238 and 240 both by resilient means 280 and 312 as described above is opposed by a corresponding amount of force of roller 236 bearing against the track upon which mobile unit 218 is mounted. Depending upon the pressure within cylinder 280, the amount of force applied by the stated rollers may be considerably more than that sufficient to support the unit continuously on a track in any attitude regardless of its weight.

In addition to the uses and operations described above, it is obvious that mobile unit 218 may be readily adapted for other types of fabrication operations. For example, cutter 220 may be replaced by various other well known tools such as milling cutters, grinding or polishing tools, broaching tools, saws, and many others known to those skilled in the art.

A mobile unit 418 corresponding generally with unit 18 shown in FIGURES 1 and 3–7, inclusive, except for adjustability features as discussed below is shown in FIGURES 20–23, inclusive. Referring particularly to FIGURE 20, mobile unit 418 is shown in an exploded view from which the supporting track and track roller details are omitted, since the track and mounting provisions therefore used with unit 418 may be precisely the same as those shown and described in detail above in connection with the embodiments shown by FIGURES 1–12, for example. Mobile unit 418 includes a platform portion 434 supported in rolling contact with a track of the stated type. Drive means for driving unit 418 along such track are provided in the form of motor 448 which may be powered by electricity, air or other means and which in any case is mounted upon platform 434 as shown.

Also mounted on platform 434 and supported by a sliding member 422 is a cutting tool including a drive motor 430 connected to cause rotation of high speed cutter 420. The position of cutter 420 with respect to the workpiece is adjustable by means discussed in detail below.

From FIGURE 20 it may be seen that a transversely slidable member 422 is supported in sliding contact with the upper surface of platform portion 434, sliding movement of member 422 being guided by two overhanging track elements, one of which is shown at 424. Laterally extending flange portions 438 and 440 are integrally formed at the upper and lower surfaces of slidable member 422, respectively. A pair of spindles 442 and 444 are fixedly joined to each of the stated flange portions and extend therebetween to form vertical guide means in cooperation with hollow tubular sleeves 450 and 452 within which the spindles are located. Sleeves 450 and 452 provide retention and guidance means for vertically movable block 454 having a hole at either end thereof through which sleeves 450 and 452 extend. A motor support member 432 is affixed to block 454 by bolts or other suitable means whereby member 432 is movable with the stated block. A drive motor 430 is connected to cause rotation of a cutter 420 and is clamped within motor support 432 when assembled in operative relationship therewith. Guide means for controlling the cutting path of cutter 420 is also provided in the form of a guide roller 456 pivotally mounted at the end of an arm element 458 attached to a guide block 460 which is adjustably mounted on block 454 and movable therewith. A knob 462 integrally formed with a threaded shank 464 is rotatably mounted in a laterally extending flange 466 formed on block 454 whereby rotation of knob 462 causes vertical movement of block 460 with respect to block 454 for adjustably positioning guide roller 456. A rotatable locking nut 468 having a threaded stud which extends through slot 470 and block 460 engages a threaded hole in block 454 whereby rotation of element 468 exerts clamping force upon block 460 to hold the same in fixed position relative to block 454 after adjustment of such position by means of knob 462 as aforesaid.

Additional details of mobile unit 418 may be seen from FIGURES 21, 22 and 23 showing the unit in operatively assembled relationship. Means for adjusting the position of cutter 420 and guide roller 456 transversely with respect to the path of movement thereof are shown more particularly in FIGURES 22 and 23. The stated means includes an upstanding bracket support or bearing mount 480 integrally formed with or otherwise affixed to platform portion 434. An arrangement of parts such as that shown and described above in connection with bearing means 76, 86 in FIGURE 7, for example, may be provided within bracket 480 to permit rotation of a shaft 482 while preventing lateral movement of the shaft.

As shown by FIGURE 23, one end of shaft 482 is threaded and operatively engages slidable member 422 by means of a hole therein having correspondingly oppositely directive threads cooperating with those on shaft 482. Shaft 482 is rotatable by means of a knob 484 affixed on the end of shaft 482 opposite from the threaded portion referred to above. A scale element 486 is also affixed to shaft 482 by means of which the extent of rotation thereof may be visually determined in the manner common to rotational scales having a stationary reference index. By means of the structure thus described it will be understood that rotation of shaft 482 by means of knob 484 will result in translational movement of slidable member 422 along a linear path of movement guided by tracks 424 and 426 to adjust the position of cutter 420 which is operatively related to slidable member 422 so as to move therewith. Holding means are provided in the form of a brake nut 488 corresponding generally in structure and function with brake 468 described above in connection with guide block 460. Brake nut 488 may be mounted on track 426 as shown by FIGURE 22 and applies clamping force upon slidable member 422 to hold the same continuously in any desired position of adjustment.

It may also be seen from FIGURE 22 that drive means for driving unit 418 along a supporting track such as shown, for example, by FIGURE 2 are provided in the form of motor 490 which may be powered by electricity, air or other means and which in any case is mounted upon platform 434 on a transversely movable member 492 corresponding generally in structure and function with member 158 described above in connection with the embodiment shown in FIGURE 8.

Referring now to FIGURE 21, it may be seen that guide roller 456 may be positioned to contact the surface of a workpiece from which it is desired to remove material by the action of cutter 420. In the illustrative example suggested by FIGURE 21, cutter 420 is shown being used to provide a smooth surface 494 on a workpiece 492 after the welding operation by removing the protruding mound of metal comprising a weld bead 496 along a line coinciding with the weld seam. Since surface 494 of the workpiece is never absolutely straight or flat and may involve variations in form depending upon the shape of workpiece 492, accurate control of the path of movement of cutter 420 is essential in order to avoid damage to the workpiece. Accordingly, guide roller 456 is maintained in continuous rolling contact with surface 494 and closely adjacent the cutting area of cutter 420 and is operatively related thereto whereby vertical movement of roller 456 either upwardly or downwardly as viewed in FIGURE 21 causes corresponding movement of cutter 420. Thus, every variation in the shape of surface 494 is reflected in movement of roller 456 which continuously positions cutter 420 so that its path of travel coincides exactly with the contour of the surface upon which cutting is accomplished.

The means by which roller 456 accomplishes the stated function includes a guide roller arm 458 upon which the roller is rotatably mounted by a pivot 472 at one end thereof, while the other end of arm 458 is affixed to guide block 460 by suitable means such as bolts 474 and 476 as shown, for example, by FIGURE 20. Guide block 460 is in turn clamped by suitable means to block 454 and is held in stationary relationship therewith by threaded shaft 464 and break 468 described hereinabove. Motor support block 432 is also affixed to block 454 while motor 430 upon which cutter 420 is mounted is securely clamped within motor support 432. Thus, block 454 and the stated elements affixed thereto comprise a single assembly of parts which moves in unison. Vertical movement of block 454 occurs along a path limited by sleeve 450 and 452 upon which block 454 is slidably journaled as described above.

With reference to FIGURE 23, it may be seen that means are provided for biasing block 454 downwardly which tends to maintain guide roller 456 firmly in rolling contact with surface 494 of workpiece 492. The stated biasing means may comprise a spring, but in the illustrative embodiment of FIGURE 23 comprise an air cylinder 498 having an appropriate tube connection 500 for communication with an external source of air pressure. Many of the various types of air cylinders commercially available would be appropriate for use in the manner described for air cylinder 498 as will readily appear to those skilled in the art. The biasing device need only consist essentially of a piston (not shown) enclosed within the cylinder and having the piston rod extending axially through a hole in the cylinder end wall in the manner shown by piston rod 502 in FIGURE 23. Air under pressure admitted through connection 500 may be caused to apply pressure within cylinder 498 on one side of the piston therein, while a compression spring contained within cylinder 498 acting on the opposite side of the piston therein biases the stated piston in a direction opposite from that caused by application of the stated air pressure. Cylinder 498 may be clamped by external brackets 504 or other suitable means to affix the cylinder to block 454 and hold the same in stationary relationship therewith.

Piston rod 502 may be affixed to slidable member 422 by the action of two collars or snap rings 506 and 508 engaging the piston rod and contacting the surfaces on each side of a hole in the stated member through which piston rod 502 extends as shown by FIGURE 23. Thus, the application of air pressure at connection 500 causes pressurization within cylinder 598 at the lower end thereof. Since the piston within cylinder 498 is affixed to piston rod 502 which in turn is immovably attached to slidable member 422, the piston remains stationary while the cylinder tends to move in a downward direction resulting in a similar tendency of block 454 to which cylinder 498 is secured by bracket 504. The stated downward movement of cylinder 498 and parts connected thereto is limited by contact of guide roller 456 against surface 494 of workpiece 492 as shown, for example, by FIGURE 21. The amount of downward force thus applied to maintain guide roller 456 in continuous contact with surface 494 depends upon the amount of air pressure applied through connection 500. From the structure thus described, it will be understood that vertical motion of guide roller 456 resulting from variations in the contour of surface 494 during movement of mobile unit 418 along a supporting track will cause corresponding movement of block 454, motor support 432 which is affixed to block 454, and motor 430 which is clamped within support 432.

Since cutter 420 is secured to the rotating element of motor 430 and necessarily moved therewith, it follows that guide roller 456 guides and continuously controls the path of movement of cutter 420 with great accuracy. With respect to FIGURE 23, it may also be seen that guide roller arm 458 may be formed to position guide roller 456 on either side of cutter 420 depending upon the shape of workpiece or particular cutting operation involved, or may be provided with a yoke around the cutter so that a separate guide wheel is provided at the same time on either side of the cutter.

In connection with FIGURES 24 and 25, a horizontal spindle attachment 520 is shown for use with mobile unit 418, for example, when the cutting operation requires the use of a horizontal position such as that shown by cutter 522. Cutter 522 may be driven by a motor shown at 524 of the type disclosed in connection with motor 430 in the embodiment shown by FIGURE 23, for example. Motor 524 is securely clamped within a housing 526 provided with two vertical flanges on either side thereof as shown at 528 and 530. A plurality of holding bolts such as shown at 532 may be positioned to extend through slots 534 and 536 in each of the stated flanges to secure housing 526 against surface 538 of motor support 432 shown in FIGURES 20 and 23, for example.

Referring to FIGURE 26, it may be seen that the technique disclosed herein for use in cutting operations is adaptable to other kinds of manufacturing operations such as welding. Thus, a track 600 of the type described above in connection with track 10 shown by FIGURES 1 and 2, may be mounted on a surface of the workpiece to be welded, such as honeycomb panel workpiece 602. After performing a cutting operation as necessary to trim accurately the edges of two workpieces such as panel sections 602 and 604 by means such as mobile unit 118 shown by FIGURE 8, for example, the panel sections may be positioned as shown by FIGURE 26 with the trimmed edges precisely in contact and prepared for welding. Thereafter, a mobile unit 606 generally comprising a suitable welding unit 608 mounted on a platform portion 610 may be mounted on track 600 in a manner generally similar to that described in connection with mobile units 18 and 118 discussed above in connection with the embodiments shown by FIGURES 6 and 8, respectively, for example. Platform portion 610 is supported on track 600 and in rolling contact therewith by roller means coinciding with the supporting structure disclosed in connection with platform 134 in the embodiment shown by FIGURE 8. Drive means for driving mobile unit 606 along track 600 are provided in the form of motor 612 corresponding to motor 148 shown in FIGURE 8 and mounted similarly except for the simple reversal of parts occasioned by use of the driving motor on the opposite end of unit 606 from the mounting used for units 118. Welding unit 608 is provided with flexible conduit means 614 for connection with an external power source and welding head 616 positioned so as to produce welding heat along the desired direction during the welding operation. If additional material is required to affect a suitable welded joint in any particular case, wire feed means such as generally indicated at 618 may be mounted on platform 610 and operatively related with welding unit 608 in the manner common to wire feeders as widely used in the welding art. Since no particular welding unit is required for use with mobile unit 606 and the details thereof are not essential to the inventive concept disclosed herein, such details are not included in this disclosure.

In a manner similar to that suggested in connection with mobile unit 606, various other devices useful in different manufacturing operations may be adapted to the technique disclosed herein. A further variation of the teachings disclosed herein could be accomplished by mounting various inspection devices such as portable X-ray equipment on a supporting platform similar to platform portion 610 to provide continuous inspection of weld seams as accomplished by mobile unit 606. From the stated examples, it may be seen that the inventive concept disclosed herein is of extremely broad application and constitutes a new mass production technique. The speed and accuracy as well as the low cost of the equipment disclosed herein provide a combination of beneficial results unequalled by conventional manufacturing devices and methods.

While the particular details set forth above and in the drawings are fully capable of attaining the objects and providing the advantages herein stated, the structures and methods thus disclosed are merely illustrative and could be varied or modified to produce the same results without departing from the scope of the inventive concept as defined in the appended claims.

We claim:
1. In self-guided mobile fabrication apparatus:
tool means including a tool for performing a fabrication operation on a workpiece,
carriage means for mounting said tool means in operative relationship with said workpiece,
track means for supporting said carriage means movably with respect to said workpiece,
roller means connected to said carriage means and operatively engaging said track means,
force means supported on said carriage means including a pneumatic cylinder for applying force to said roller means to maintain said operative engagement of said roller means with said track means, and
moving means on said carriage means for moving said carriage means relative to said track means during operation of said tool.
2. In self-guided mobile fabrication apparatus:
tool means including a tool for performing a fabrication operation on a workpiece,
carriage means for mounting said tool means in operative relationship with said workpiece,
track means for supporting said carriage means movably with respect to said workpiece,
said track means including a relatively thin rigid elongate track rigidly supported in stationary relationship with respect to said workpiece,
said track means further including vacuum cup means between said track and said workpiece for detachably securing said track to a surface of said workpiece, and
moving means on said carriage means for moving said carriage means relative to said track means during operation of said tool.
3. The apparatus set forth in claim 2 above, wherein: said tool comprises a welder.
4. The apparatus set forth in claim 2 above, wherein: said vacuum cup means includes a plurality of vacuum cups, and
said elongate track is formed in a plurality of separate sections including means to detachably secure together said sections in mutual operative relationship, each of said sections having at least one of said vacuum cups secured thereto.
5. In self-guided mobile fabrication apparatus:
tool means including a tool for performing a fabrication operation on a workpiece,
carriage means for mounting said tool means in operative relationship with said workpiece,
track means for supporting said carriage means movably with respect to said workpiece,
said carriage means including a platform,
said carriage means further including truck means mounted on said platform,
said truck means including a plurality of trucks,
said truck means further including a plurality of roll- ers mounted on said trucks and operatively engageable with said track means,
said truck being independently movable both rotationally and lineally with respect to said platform.

6. The apparatus set forth in claim 5 above, wherein:
said rollers each include a pair of spaced-apart radially outwardly extending peripheral flanges adapted to engage the upper and lower surfaces of said track along a distal edge thereof,
said flanges including a pair of generally confronting surfaces forming an included angle whereby said distal edge is wedged therebetween to center said edge between said flanges.

7. Self-guided mobile fabrication apparatus comprising:
tool means including a tool for performing a fabrication operation on a workpiece,
carriage means for mounting said tool means in operative relationship with said workpiece,
track means for supporting said carriage means on said workpiece,
roller means mounted on said carriage means for operative engagement with said track means,
said track means including an elongate track formed by a plurality of individual sections releasably joined together at adjacent confronting ends of said individual sections, and means for detachably securing said track on said workpiece.

8. In self-guided mobile fabrication apparatus including a fabrication tool mounted on a movable carriage supported on a relatively stationary elongate track having substantially constant width and oppositely situated distal edges:
roller support means mounted on said carriage for supporting said carriage on said track,
said roller support means including a plurality of trucks mounted for pivotal movement relative to said carriage about two mutually normal pivot axes,
each said truck having a pair of rollers mounted thereon in spaced-apart relationship,
each one of said rollers in said pair being mounted for rotation relative to said truck about a rotation axis lying on an opposite side of both said pivot axes relative to the other said roller in said pair, and
flange means on each said roller for restraining translational movement of each said roller along said rotation axis relative to said track.

9. The structure set forth in claim 8 above, including in addition thereto:
force means mounted on said carriage for applying force to at least one of said trucks in a direction tending to hold said pair of rollers on said truck in operative engagement with said track.

10. The structure set forth in claim 8 above, including in addition thereto:
a drive roller rotatably mounted on said carriage and operatively engaging one side of said track,
motor means connected to said drive roller for rotating same,
a support member,
means operatively connecting said support member to said carriage for permitting independent sliding movement of said support member relative to said carriage along a transverse axis substantially normal to the direction of carriage movement along said track, and
means supporting said drive roller on said support member for rotational movement of said drive roller about a rotation axis during operation of said motor means.

11. The structure set forth in claim 10 above, wherein:
one of said trucks is mounted on said carriage for operative engagement with a side of said track opposite from the side of said track engaged by said drive roller, and
means connecting said support member to said one truck for pivoting said support member about said transverse axis in unison with pivotal movement of said truck about one of said normal axes.

12. The structure set forth in claim 11 above, wherein:
said means connecting said support member to said one truck comprises a pin operatively engaging a pair of tangs.

13. Self-guided mobile fabrication apparatus comprising:
tool means including a tool for performing a fabrication operation on a workpiece,
carriage means for mounting said tool means in operative relationship with said workpiece,
track means for supporting said carriage means on said workpiece,
slide block means mounted on said carriage means for translational sliding movement along a linear path relative to said carriage,
a plurality of rollers mounted in spaced-apart relationship on said slide block means and movable therewith along said linear path, and
an air cylinder mounted on said carriage means and adapted to apply biasing force to bias said rollers into continuous operative engagement with said track means.

14. The structure set forth in claim 13 above, further including:
spring means including a spring mounted in said slide block for biasing one of said rollers by independent biasing force into operative engagement with said track means.

15. Self-guided mobile fabrication apparatus comprising:
track means including an elongate track,
detachable support means for detachably supporting said track in stationary relationship on a workpiece,
a platform member,
a plurality of rollers mounted on said platform member and operatively engaging said track for supporting said platform on said track in relatively movable relationship therewith,
a sliding member mounted on said platform member for sliding movement relative to said platform member along a slide axis generally normal to the direction of movement of said platform member relative to said track,
support means movably mounted on said slidable member for movement relative to said slidable member along a linear path substantially normal to said slide axis and to said direction of movement of said platform,
tool means including a tool for performing a fabrication operation on a workpiece,
means affixing said tool means on said support means,
adjusting means mounted on said platform for adjustably positioning said slidable member, said support means and said tool relative to said workpiece, and
guide means operatively related to said support means for guiding said movement of said support means relative to said slidable member to maintain constant said adjusted position of said tool relative to said workpiece.

16. The structure set forth in claim 15 above, wherein:
said guide means includes a guide wheel mounted on said support means and adapted to contact said workpiece, and
said guide means further includes an air cylinder operatively connected between said slidable member and said support means for biasing said guide wheel into continuous contact with said workpiece by applying force to said support means along said linear path.

(References on following page)

References Cited by the Examiner

UNITED STATES PATENTS

| | | | |
|---|---|---|---|
| 1,423,154 | 7/1922 | Rosak | 90—13 |
| 2,026,109 | 12/1935 | Walters | 33—27 |
| 2,116,870 | 5/1938 | Rockefeller et al. | 226—23 |
| 2,183,605 | 12/1939 | Bucknam et al. | 226—23 |
| 2,314,327 | 3/1943 | Drake | 33—27 |
| 2,323,528 | 7/1943 | Faulhaber | 90—13 |
| 2,474,153 | 6/1949 | Livesay | 33—27 |
| 2,676,504 | 4/1954 | Brugge et al. | 269—21 |
| 2,798,299 | 7/1957 | Cooper | 33—177 |
| 2,811,085 | 10/1957 | Burke | 90—13 |
| 2,813,710 | 11/1957 | Angle | 33—177 |
| 2,891,451 | 6/1959 | Hess | 90—13 |
| 2,925,017 | 2/1960 | Bales et al. | 269—21 |
| 2,990,305 | 6/1961 | Richardson | 269—21 |
| 3,010,352 | 11/1961 | Dunlap | 90—13 X |

WILLIAM W. DYER, JR., *Primary Examiner.*

L. PEAR, *Examiner.*

G. A. DOST, *Assistant Examiner.*